United States Patent
Dierks

[15] 3,677,152
[45] July 18, 1972

[54] CAMERA

[72] Inventor: James E. Dierks, Rochester, N.Y.

[73] Assignee: Eastman Kodak Company, Rochester, N.Y.

[22] Filed: Jan. 27, 1971

[21] Appl. No.: 110,218

[52] U.S. Cl. .................................................95/11 R
[51] Int. Cl. ............................................G03b 19/02
[58] Field of Search ........................95/11 R, 31 R, 12.5

[56] References Cited

UNITED STATES PATENTS 1,821,492   9/1931   Briechle.................................95/12.5
2,660,103   11/1953   Culp.................................95/11 R X

*Primary Examiner*—John M. Horan
*Assistant Examiner*—Kenneth C. Hutchison
*Attorney*—W. H. J. Kline and D. Peter Hochberg

[57] ABSTRACT

A camera including a generally prismatic body which includes a pair of relatively rotatable sections. One section houses a mechanism for transporting film strip past an exposure station at which frames of film are sequentially exposed, and the other section is coupled to the transport mechanism and is rotatable for successively actuating the mechanism to effect the incremental advancement of the film. The provision of the actuating means changes no camera dimension other than slightly increasing the length of the camera.

7 Claims, 3 Drawing Figures

Patented July 18, 1972

3,677,152

JAMES E. DIERKS
INVENTOR.

BY D. Peter Hochberg
W. H. J. Kline

ATTORNEYS

CAMERA

BACKGROUND OF THE INVENTION

1. Field of the Invention

This invention relates to cameras, and in particular to the means by which the filmstrip transport mechanism in a still camera is actuated.

2. Description of the Prior Art

Most still cameras in current use are adapted to receive a roll of filmstrip and to incrementally advance the filmstrip past an exposure station at which frames of the filmstrip are successively exposed. The leading end of the filmstrip is generally fastened to a take-up core which is rotated to draw the film towards the core and to wind the film thereon. Some cameras effect film advancement by rotating a sprocket wheel which is engaged with perforations provided along the edges of the filmstrip. The various film advancing mechanisms, whether they be in cameras adapted to receive filmstrip in a single container as in most 35mm cameras or in cameras adapted to receive film cartridges comprising a pair of film compartments disposed on opposite sides of a film support wall, are actuated by a lever, knob or similar manually operable device.

The actuating means for the film advancing mechanism must satisfy various criteria. It should be readily operable, which requires that the actuating means be large enough to be grasped with ease. Levers and knobs can usually be gripped between the photographer's thumb and forefinger. On the other hand, the actuating means should not be susceptible to damage and it should not render the camera unwieldy. Most current camera bodies are of sufficient size relative to the film winding member that recesses can be provided in the camera body to accommodate the winding member whereby the member's dimensions and operating space do not detract from the basic size of the camera body.

There have recently been developed several sub-miniature cameras which find great utility by virtue of their ease of storage and their inconspicuous appearance. These cameras are designed to receive filmstrip having a size of about 16mm. The camera designer of such cameras is posed with the difficult problem of maintaining a small size and low silouette for the camera while providing a sturdy and effective device for actuating the film advancing mechanism in the camera. The problem is aggravated by the reduced size of the camera since the actuating device may have to withstand a greater operating force to compensate for the decreased space for force-saving leverage in the components of the film advancing mechanism. The knobs and levers which have previously been used on cameras for actuating the film advancing mechanism in the camera are inadequate for these small cameras because they add substantially to the dimensions of the camera if they are to be effective in use. On the other hand, if the size of these actuating members is reduced to a size commensurate with that of the camera, they become too weak to sustain the forces applied to the, and they are rendered too small to be easily operable.

SUMMARY OF THE INVENTION

An object of the invention is to provide an effective means for actuating the film advancing mechanism of a camera.

Another object is to provide a rugged yet easily operable actuating device for the film transport mechanism of a camera.

A more specific object of the present invention is to provide a device for actuating the film advancing mechanism of a sub-miniature camera, which does not add appreciably to the bulk of the camera.

A further object is to provide a sturdy and easily operable device for a subminiature camera without increasing the height or depth of the camera.

An additional object is to achieve the foregoing objects in an economical manner.

Other objects will be apparent to those skilled in the art from the description to follow and from the appended claims.

The preceding objects are accomplished by the provision of a camera having a generally prismatic body which includes a pair of relatively rotatable sections. One section houses the mechanism for transporting filmstrip past an exposure station at which frames of film are sequentially exposed, and the other section is coupled to the transport mechanism and is rotatable for successively actuating the mechanism to effect the incremental advancement of the film. The provision of the actuating means changes no camera dimension other than slightly increasing the length of the camera.

BRIEF DESCRIPTION OF THE DRAWINGS

In the preferred embodiment of the invention described below, reference is made to the accompanying drawings in which.

DESCRIPTION OF A PREFERRED EMBODIMENT OF THE INVENTION

Figure 1:
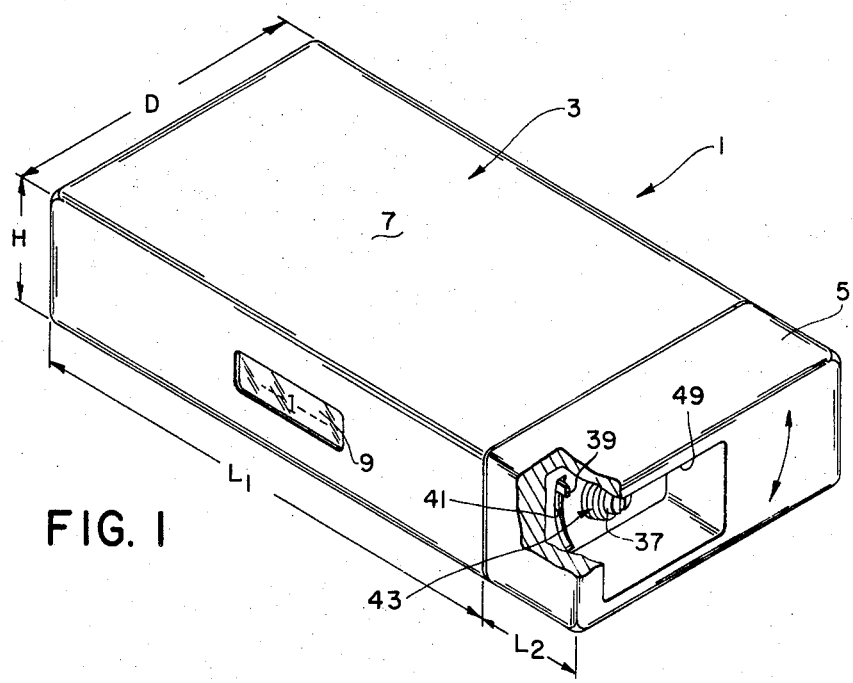
FIG. 1 is a rear isometric view of a camera according to the invention, with a portion cut away to reveal an interior part thereof.

A camera is shown in FIG. 1 which has a body 1 including a first section 3 and a second section 5. The camera is of the subminiature type and is dimensioned to fit, for example, in a man's jacket pocket. First section 3 of the camera includes a housing 7 which contains the various operating mechanisms of the camera, and has an objective lens disposed on the front of the camera (not fully visible in the drawings) and a window 9 in the rear of the camera through which indicia on the back of filmstrip in the camera are visible. Housing 7 is defined by a depth dimension D between the front and rear walls of the camera, a height dimension H which is substantially less than D, and a length dimension $L_1$.

Figure 2:
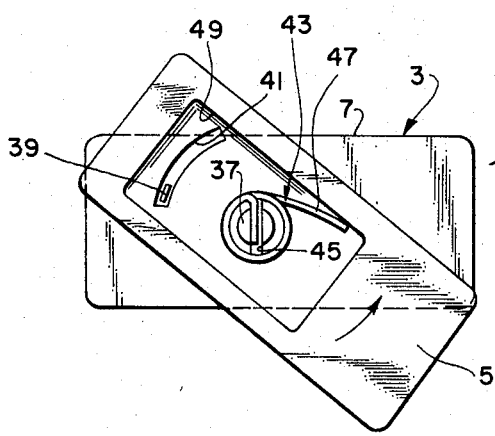
FIG. 2 is an end view of the camera shown in FIG. 1, with the film winding member showed in an active position.

Second section 5 of the camera is actually a knob for actuating the film transport mechanism which is housed in section 3. Section 5 is rotatable relative to section 3 as indicated by the arrow in FIG. 1. Section 5 is configured to define an end of the camera, and has height and depth dimensions substantially equal to the corresponding dimensions of section 3. Section 5 has a length $L_2$ which is of sufficient size to allow a photographer to grip section 5 and rotate it to the position shown in FIG. 2. The two sections 3 and 5 thus form a compact prismatic package which is devoid of components extending therefrom.

Figure 3:
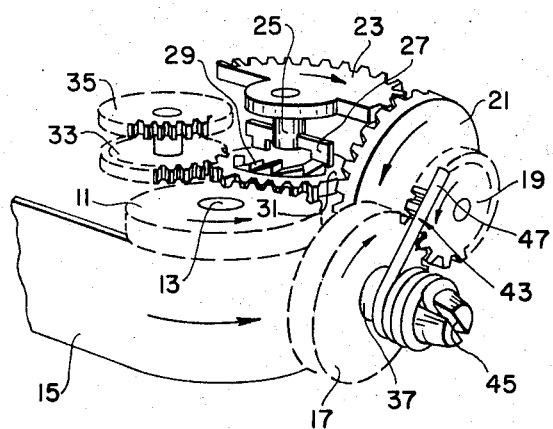
FIG. 3 is a partial isometric view of the film transport mechanism of the camera shown in FIG. 1.

A film transport mechanism which can be incorporated in the camera is shown in FIG. 3 although other such mechanisms will be known to those skilled in the art. The mechanism comprises a gear train adapted to rotate a gear 11 from which extends a film take-up core 13, for winding film 15 about the core. Gear 11 and core 13 can be part of a film cartridge, these elements being represented schematically in the drawing for the sake of clarity. The gear train illustrated includes a drive gear 17 which is enmeshed with a gear 19, the latter being pinned to a gear 21. Gear 21 is provided with teeth on one face thereof which are engaged with the teeth of a rotatable sector gear 23, the latter gears being mounted for rotation in perpendicular planes.

A post 25 is mounted on gear 23 and has extending radially therefrom a pawl 27 which is engaged with a ratchet 29 for effecting rotation of a gear 31 on which the ratchet is located, in response to the clockwise rotation of gear 23. Gear 31 remains stationary when gear 23 is rotated counterclockwise. The teeth of gear 31 are engaged with the teeth of gear 11. A film metering gear 33, to which a gear 35 is pinned, can also be engaged with gear 31 and is rotatable upon the displacement of the latter. The gear train is operated in response to the rotation of gear 17 which is integral with section 5. Section 5 is mounted on a post 37 which extends from Section 3. Post 37 is disposed slightly rearwardly of the middle of the camera.

The rotation of section 5 is the means by which the film transport mechanism is actuated. The rotational path of section 5 is indicated by the arrow in FIG. 1, and it may be observed that section 5 is movable from the inactive rest position shown in FIG. 1 to the position shown in FIG. 2 to effect film advancement. Since film 15 should only be advanced in increments sufficient to position successive frames of film at the camera exposure station, the rotation of section 5 is restricted by a fixed pin 39 extending from section 3 through an arcuate slot 41 disposed radially from post 37. Section 5 is biassed towards its rest position by a torsion spring 43 wound around post 37 and fixed at one end in a slot 45 in post 37. A leg 47 of the spring abuts against a wall 49 of section 5. As section 5 is rotated clockwise, the coils of spring 43 increase their grip on post 37, and leg 45 exerts an increasing counterclockwise force in section 5.

The transport of film 15 in camera 1 is accomplished in a straightforward manner. After taking a picture, the photographer grasps section 5 and rotates it clockwise until the lower end wall of slot 41 abuts against pin 39. Rotation of section 5 is facilitated by the eccentric mounting of the section on post 37. This rotation causes a like displacement of gear 17 about post 37. The rotation of gear 17 rotates gears 19 and 21 counterclockwise. Sector gear 23 is thereby rotated clockwise, as in gear 31, due to the positive engagement of pawl 27 in ratchet 29. In response to the foregoing displacements, gears 11, 33, and 35 rotate counterclockwise to advance film 15 and to operate the metering mechanism, respectively. The foregoing motions are indicated by arrows on the various parts. Upon completion of the movement of section 5, it is released and subsequently spring driven to the rest position. The return movement of section 5 displaces elements 17, 19, 21, 23, 25 and 27 to their initial positions, gear 31 and the elements driven thereby remaining stationary since pawl 27 rides over the teeth of ratchet 29 rather than positively engaging them.

It can be seen that the camera described above incorporates a sturdy, easily actuable film winding knob despite the small size of the camera. The silouette and depth of the camera are not changed by the provision of this member, and the knob cannot be damaged during handling and is not likely to damage a pocket or storage case when the camera is not in use.

The invention has been described in detail with particular reference to a preferred embodiment thereof, but it will be understood that variations and modifications can be effected within the spirit and scope of the invention.

I claim:

1. A camera for receiving filmstrip and making photographic exposures, said camera comprising:
    a generally prismatic housing having length, height and depth dimensions, said body being structured to hold filmstrip;
    means disposed in said housing for transporting filmstrip in the housing;
    a knob coupled to said transporting means for actuating said means, said knob having length, height and depth dimensions, said height and depth dimensions being substantially equal to the corresponding dimensions of said housing, and said knob being located adjacent said housing to form a unit having a length equal to the combined lengths of said knob and housing, and height and depth dimensions equal to the height and depth dimensions of said housing.

2. A camera for receiving filmstrip and for making photographic exposures, said camera comprising:
    a prismatic housing for receiving the filmstrip, said housing having a lateral end portion, and height and depth dimensions;
    a mechanism in said housing for incrementally transporting the filmstrip; and
    means for actuating said transporting mechanism, said actuating means having a prismatic configuration and height and depth dimensions equal to the height and depth dimensions of said housing, and being located adjacent the lateral end portion of said housing and rotatable relative to said housing for actuating said advancing mechanism;
    wherein said camera has a height and depth dimension defined by the height and depth of said housing.

3. A camera according to claim 2 wherein the height dimension of said camera is substantially less than the depth dimension of said camera.

4. A camera according to claim 3 wherein said advancing mechanism comprises a gear train coupled to said actuating means.

5. A camera according to claim 3 wherein said mechanism is sequentially displaceable in amounts sufficient to transport the filmstrip in predetermined increments, and said camera further includes means for restricting the rotation of said actuating means by an amount sufficient to displace said mechanism by said amounts.

6. A camera according to claim 5 wherein said housing and said actuating means have corresponding front portions, and said actuating means has a rest position from which said means is rotatable for actuating said transporting means, said front portions being flush when said actuating means is in the rest position.

7. A camera according to claim 6, said camera further including means for urging said actuating means to said rest position.

* * * * *